United States Patent
Mahony et al.

(10) Patent No.: US 12,093,401 B2
(45) Date of Patent: Sep. 17, 2024

(54) SECURING DATA STORAGE BY SLICING SWAPPED DATA PORTIONS INTO DATA FRAGMENTS AND SHUFFLING PHYSICAL STORAGE LOCATION OF DATA FRAGMENTS

(71) Applicant: Dell Products L.P., Round Rock, TX (US)

(72) Inventors: Aidan O Mahony, Cork (IE); David Bowden, Cork (IE); Alan Barnett, County Cork (IE)

(73) Assignee: Dell Products L.P., Round Rock, TX (US)

( * ) Notice: Subject to any disclaimer, the term of this patent is extended or adjusted under 35 U.S.C. 154(b) by 385 days.

(21) Appl. No.: 17/511,872

(22) Filed: Oct. 27, 2021

(65) Prior Publication Data
US 2023/0125593 A1   Apr. 27, 2023

(51) Int. Cl.
*G06F 21/60* (2013.01)
*G06F 16/23* (2019.01)
*H04L 67/1097* (2022.01)

(52) U.S. Cl.
CPC .......... *G06F 21/60* (2013.01); *G06F 16/2365* (2019.01); *H04L 67/1097* (2013.01)

(58) Field of Classification Search
CPC ...... G06F 21/60; G06F 16/2365; G06F 21/64; H04L 67/1097
See application file for complete search history.

(56) References Cited

U.S. PATENT DOCUMENTS

| | | | |
|---|---|---|---|
| 7,162,571 B2 | 1/2007 | Killian et al. | |
| 8,938,416 B1 | 1/2015 | Cole et al. | |
| 9,471,595 B1 | 10/2016 | Vempati et al. | |
| 10,956,375 B2 * | 3/2021 | Barnett | G06F 16/137 |
| 2004/0143595 A1 | 7/2004 | Cherkasova et al. | |
| 2006/0161761 A1 * | 7/2006 | Schwartz | G06F 21/64 |
| | | | 711/216 |

(Continued)

OTHER PUBLICATIONS

Bacis et al., "Mix and Slice: Efficient Access Revocation in the Cloud," in Proceedings of the 23rd ACM Conference on Computer and Communications Security, CCS 2016, pp. 217-228, Oct. 2016.

(Continued)

*Primary Examiner* — Abiy Getachew
(74) *Attorney, Agent, or Firm* — Ryan, Mason & Lewis, LLP (57) ABSTRACT

Techniques are provided for securing data storage by slicing swapped data portions into data fragments and shuffling a physical storage location of the data fragments. One method comprises obtaining at least one data item; dividing the at least one data item into a plurality of data portions; swapping respective positions of at least two of the data portions of the at least one data item; slicing the plurality of data portions, following the swapping, into a plurality of data fragments; and shuffling a distribution of the data fragments across a plurality of storage nodes in a storage system by moving at least one data fragment from a current physical storage location on a current storage node to a different physical storage location on a different storage node. A predefined number of the plurality of data fragments may be needed to reconstruct the data item.

20 Claims, 8 Drawing Sheets

(56) References Cited

U.S. PATENT DOCUMENTS

| | | | |
|---|---|---|---|
| 2011/0013849 A1* | 1/2011 | Saito | H04N 19/88 |
| | | | 382/233 |
| 2011/0137930 A1 | 6/2011 | Hao et al. | |
| 2014/0181528 A1* | 6/2014 | Ram | G06F 21/64 |
| | | | 713/176 |
| 2016/0044108 A1 | 2/2016 | Vermeulen et al. | |
| 2017/0031988 A1 | 2/2017 | Sun et al. | |
| 2017/0249781 A1 | 8/2017 | Wald et al. | |
| 2018/0157521 A1 | 6/2018 | Arikatla et al. | |

OTHER PUBLICATIONS https://github.com/mosaicrown/aesmix, downloaded on Oct. 20, 2021.

J.R. Lorch et al., "Shroud: Ensuring Private Access to Large-Scale Data in the Data Center," Proceedings of the 11th USENIX Conference on File and Storage Technologies (FAST), Feb. 12-15, 2013, pp. 199-214.

S. De Capitani Di Vimercati et al., "Shuffle Index: Efficient and Private Access to Outsourced Data," ACM Transactions on Storage (TOS)—Special Issue USENIX FAST, Nov. 2015, 55 pages, vol. 11, No. 4.

Escudo-Cloud, "Enforceable Security in the Cloud to Uphold Data Ownership," http://www.escudo-cloud.eu/, downloaded May 30, 2018, 3 pages.

S. De Capitani Di Vimercati et al., "Efficient and Private Access to Outsourced Data," Proceedings of the 31st International Conference on Distributed Computing Systems (ICDCS), Jun. 20-24, 2011, pp. 710-719.

\* cited by examiner

SECURING DATA STORAGE BY SLICING SWAPPED DATA PORTIONS INTO DATA FRAGMENTS AND SHUFFLING PHYSICAL STORAGE LOCATION OF DATA FRAGMENTS

FIELD

The field relates generally to information processing systems and more particularly, to the protection of data in such information processing systems.

BACKGROUND

Data protection techniques are often employed to secure data in a storage system, typically using encryption and other access control functions. Many organizations, however, desire additional protection for the storage of certain information, such as cryptographic keys and hash values of files stored in the storage system.

A need exists for improved techniques for securing the storage of such information in a storage system.

SUMMARY

In one embodiment, a method comprises obtaining at least one data item; dividing the at least one data item into a plurality of data portions; swapping respective positions of at least two of the plurality of data portions of the at least one data item; slicing the plurality of data portions, following the swapping, into a plurality of data fragments; and shuffling a distribution of at least some of the data fragments across a plurality of storage nodes in a storage system, wherein the shuffling the distribution of at least some of the data fragments across the plurality of storage nodes comprises moving at least one data fragment of the plurality of data fragments from a current physical storage location on a current storage node of the plurality of storage nodes to a different physical storage location on a different storage node of the plurality of storage nodes.

In some embodiments, the at least one data item comprises one or more of a cryptographic key, a hash value of a file stored in the storage system, a file digest of a file stored in the storage system, and a block of data.

In one or more embodiments, the shuffling the distribution of at least some of the data fragments across the plurality of storage nodes is performed in response to an occurrence of a time-based trigger and/or an event-based trigger.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for securing data storage by slicing swapped data portions into data fragments and shuffling a physical storage location of the data fragments.

In one or more embodiments, the slicing of swapped data portions into data fragments is performed using mix and slice encryption techniques (or an all-or-nothing-transform), and the shuffling of the physical storage location of the data fragments is performed using a shuffle index. The combination of the shuffle index with a slicing of swapped data portions to create data fragments provides a cryptographic obfuscation solution that is greater than the sum of its parts.

U.S. Pat. No. 10,956,375, entitled "Shuffling File Digests Stored in Data Stores of a Distributed File System," incorporated by reference herein in its entirety, describes a shuffle index. A shuffle index, in at least some embodiments, improves access pattern confidentiality. A shuffle index addresses the issue of the physical storage locations of files being ascertainable using malicious techniques, such as access pattern analysis and eavesdropping. The shuffle index applies a layer of obfuscation to the physical storage locations of files by performing a shuffle operation upon the occurrence of a specified timeframe or event (such as upon each data access). Within a shuffle operation, the files (and/or file digests) are reordered to different physical locations across a distributed storage cluster, but the logical structure of the file system is preserved. In this manner, the file access patterns cannot be used to infer the physical locations of those files. The shuffle operation has been found to be particularly well suited to protect smaller files such as cryptographic keys, hash values and other similarly sized items.

In one or more embodiments, an all-or-nothing-transform provides an encrypted representation of an input and creates an interdependency between the bits of that input, such that the output can only be decrypted in its entirety (for example, a single missing data artifact may make decryption of the rest impossible).

With a mix and slice encryption, in some embodiments, the input is mixed to establish bit interdependency, then sliced into sections to produce multiple fragments, as discussed further below in conjunction with FIG. 2. The mix and slice encryption may comprise a slicing of swapped data portions to create data fragments.

The introduction of the slicing of swapped data portions to create data fragments that can be applied to the shuffle index improves the protection offered by the shuffle index. The data fragments can be stored on a distributed cluster and shuffled. The physical location of the data fragments would be very difficult to obtain, given the shuffle index obfuscation layer. In addition, in at least some embodiments, all of the data fragments would have to be obtained before attempting to decrypt the file. This provides a significant increase in the computational difficulty of obtaining the data resource when compared with the standalone shuffle index operating on entire files. An important point is the fact that shuffle index technology is collusion resistant when deployed alongside at least a three-node storage configuration, and more so with the addition of an all-or-nothing transform.

Figure 1:
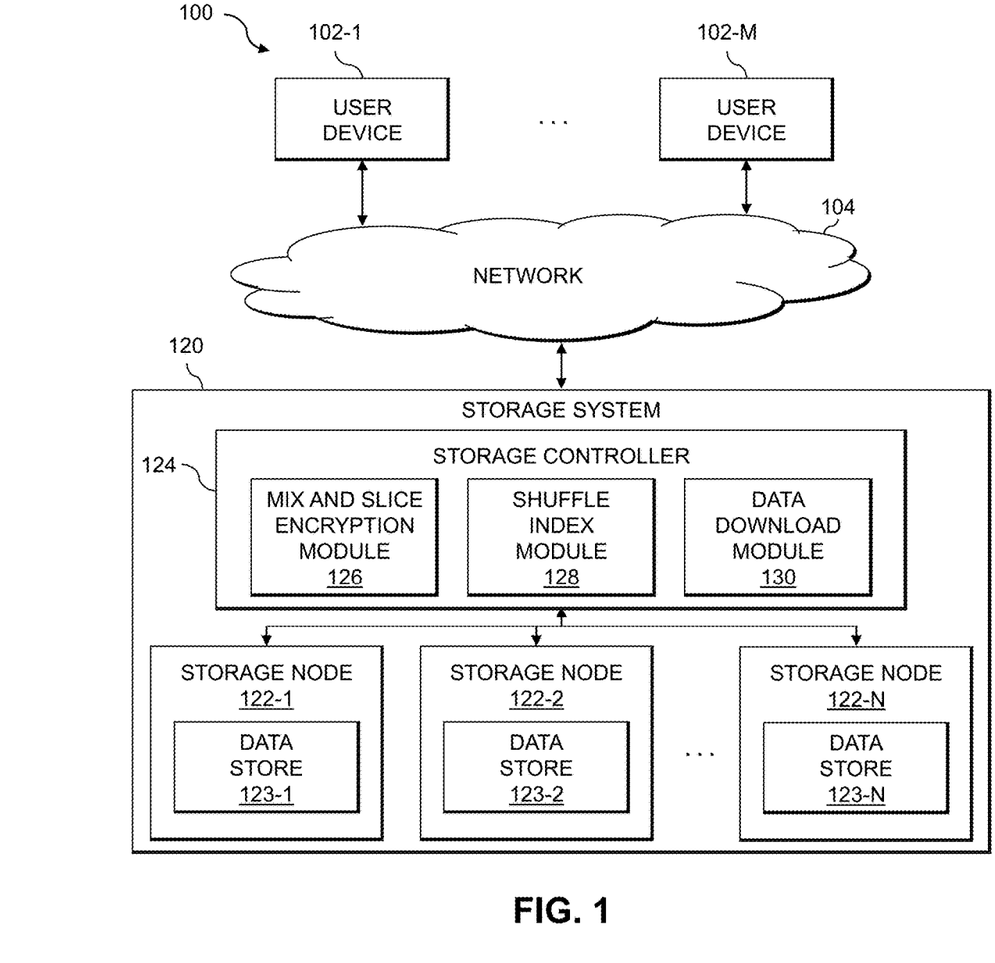
FIG. 1 illustrates a computer network configured for securing data storage by slicing swapped data portions into data fragments and shuffling a physical storage location of the data fragments in accordance with an illustrative embodiment.

FIG. 1 shows a computer network (also referred to herein as an information processing system) 100 configured in accordance with an illustrative embodiment. The computer network 100 comprises a plurality of user devices 102-1, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is a storage system 120.

The user devices 102 may comprise, for example, host devices and/or other devices such as mobile telephones, laptop computers, tablet computers, desktop computers or other types of computing devices. Such devices are examples of what are more generally referred to herein as "processing devices." Some of these processing devices are also generally referred to herein as "computers." When the user devices 102 are implemented as host devices, the host devices may illustratively comprise servers or other types of computers of an enterprise computer system, cloud-based computer system or other arrangement of multiple compute nodes associated with respective users.

For example, the host devices in some embodiments illustratively provide compute services such as execution of one or more applications on behalf of each of one or more users associated with respective ones of the host devices. Such applications illustratively generate input/output (IO) operations that are processed by the storage system 120. The term "input/output" as used herein refers to at least one of input and output. For example, IO operations may comprise write requests and/or read requests directed to logical addresses of a particular logical storage volume of the storage system 120. These and other types of IO operations are also generally referred to herein as IO requests.

The user devices 102 in some embodiments comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities. Compute and/or storage services may be provided for users under a Platform-as-a-Service (PaaS) model, an Infrastructure-as-a-Service (IaaS) model, a Function-as-a-Service (FaaS) model and/or a Storage-as-a-Service (STaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The network 104 in some embodiments therefore comprises combinations of multiple different types of networks, each comprising processing devices configured to communicate using internet protocol (IP) or other related communication protocols.

The storage system 120 illustratively comprises processing devices of one or more processing platforms. For example, the storage system 120 can comprise one or more processing devices each having a processor and a memory, possibly implementing virtual machines and/or containers, although numerous other configurations are possible.

The storage system 120 can additionally or alternatively be part of cloud infrastructure such as an Amazon Web Services (AWS) system. Other examples of cloud-based systems that can be used to provide at least portions of the storage system 120 include Google Cloud Platform (GCP) and Microsoft Azure.

The user devices 102 and the storage system 120 may be implemented on a common processing platform, or on separate processing platforms. The user devices 102 (for example, when implemented as host devices) are illustratively configured to write data to and read data from the storage system 120 in accordance with applications executing on those host devices for system users.

When a user device 102 downloads a file (or a portion of a file) from a distributed file network, the request may pass through one or more application programming interfaces (APIs), such as a file digest or hash table API that links to an actual file digest table, hash table or other data structure which stores associations between file digests or hashes and file locations. The hash table, for example, may be in the form of an index that stores the mapping between unique identifiers and file locations. In some embodiments, the file hashes themselves illustratively act as the unique identifiers for the files. This architecture may be implemented as a distributed hash table (DHT) that efficiently maps indexes between universally unique identifiers (UUIDs) (e.g., file hashes) and file locations over a potentially large distributed storage system. The DHT is also capable of adapting to the addition or removal of files from the distributed storage system. In some embodiments, the UUIDs are hash values for the files stored in the storage system 120.

Advantageously, file digests such as hash values can also be used as a guarantee that a given file has not been tampered with, as the user who downloads the given file can run the given file through a suitable function (e.g., a cryptographic hash function) and compare the hash value output with a hash value that is published by a file vendor (e.g., such as through display on a file vendor's website). Matching hash values indicate that the given file is indeed authentic, and mismatches between the computed hash value and a published hash value indicate that a file has been tampered with in some way (e.g., by a malicious actor, through errors during download or other transmission between a file vendor and a client device, etc.).

In such arrangements, an attacker who supplants a legitimate file on the distributed file system of a file vendor would subsequently need to inject the hash value of the malicious file in place of the file vendor's legitimate hash value in order for the malicious file to successfully deceive users. An attacker may be able to establish a pattern of accesses to physical storage locations through analyzing network traffic over some period of time, and thus infer the location of a given file's hash value.

The disclosed techniques for securing data storage by slicing swapped data portions into data fragments and shuffling a physical storage location of the data fragments can be utilized to obfuscate the physical locations of data fragments, such as file digests or other data objects.

The storage system 120 comprises a plurality of storage nodes 122-1 through 122-N, collectively referred to herein as storage nodes 122, and an associated storage controller 124. In some embodiments, the storage nodes 122 each comprise corresponding data stores 123-1 through 123-N, collectively referred to herein as data stores 123, that store data of a plurality of storage volumes, such as respective logical units (LUNs) or other types of logical storage volumes. The term "storage volume" as used herein is intended to be broadly construed, and should not be viewed as being limited to any particular format or configuration.

The storage nodes 122 of the storage system 120 illustratively comprise solid state drives (SSDs). Such SSDs are implemented using non-volatile memory (NVM) devices such as flash memory. Other types of NVM devices that can be used to implement at least a portion of the storage nodes 122 include non-volatile RAM (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices in the storage system 120.

It is therefore to be appreciated numerous different types of storage nodes 122 can be used in storage system 120 in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

The term "storage system" as used herein is therefore intended to be broadly construed, and should not be viewed as being limited to particular storage system types, such as, for example, CAS systems, distributed storage systems, or storage systems based on flash memory or other types of NVM storage devices. A given storage system as the term is broadly used herein can comprise, for example, any type of system comprising multiple storage devices, such as network-attached storage (NAS), storage area networks (SANs), direct-attached storage (DAS) and distributed DAS, as well as combinations of these and other storage types, including software-defined storage.

The user devices 102 are configured to interact over the network 104 with the storage system 120. Such interaction illustratively includes generating IO operations, such as write and read requests, and sending such requests over the network 104 for processing by the storage system 120. In some embodiments, one or more of the user devices 102 comprise a multi-path input/output (MPIO) driver configured to control delivery of IO operations from the respective user device 102 to the storage system 120 over selected ones of a plurality of paths through the network 104. The paths are illustratively associated with respective initiator-target pairs, with each of a plurality of initiators of the initiator-target pairs comprising a corresponding host bus adaptor (HBA) of the host device, and each of a plurality of targets of the initiator-target pairs comprising a corresponding port of the storage system 120.

The MPIO driver may comprise, for example, an otherwise conventional MPIO driver, such as a PowerPath® driver from Dell Technologies. Other types of MPIO drivers from other driver vendors may be used.

As shown in FIG. 1, the exemplary storage controller 124 comprises a mix and slice encryption module 126, a shuffle index module 128, and a data download module 130. In one or more embodiments, the mix and slice encryption module 126 performs a mix and slice encryption to generate encrypted data fragments, for example, using the "aesmix," mix and slice encryption library. The shuffle index module 128 provides for shuffling of the physical storage location of the data fragments (e.g., key values, hash values and checksums) generated by the mix and slice encryption module 126, as discussed further below in conjunction with FIGS. 3 through 5. In at least some embodiments, the shuffle index module 128 may be implemented, at least in part, based on the teachings of U.S. Pat. No. 10,956,375.

The data download module 130 receives data access or file access requests from the user devices 102 (or applications running thereon), and parses such data access or file access requests to determine UUIDs of requested data or files, in a known manner. Such UUIDs are illustratively in the form of hash values of the requested data or files. The data download module 130 utilizes the determined UUIDs to obtain the requested data or files from data stores 123, for example, implemented as part of a distributed file system.

In some embodiments, a file is transformed into encrypted data fragments by the mix and slice encryption module 126, prior to uploading the encrypted data fragments to the shuffle index module 128 (e.g., for storage in the backend distributed file system). The stored data can be presented to a user, for example, using a mounted directory on the local file system. When coupled with a file system manager, such as FUSE (File System in Userspace) the mix and slice encryption module 126 can operate on any files (or file portions) placed in a mounted directory (as used herein, the term "mounted" comprises file contents being externalized/synchronized to the shuffle index integrated distributed storage system).

It is to be appreciated that this particular arrangement of modules 126, 128, 130 illustrated in the storage controller 124 of the FIG. 1 embodiment is presented by way of example only, and alternative arrangements can be used in other embodiments. For example, the functionality associated with modules 126, 128 and/or 130 in other embodiments can be combined into a single module, or separated across a larger number of modules. As another example, multiple distinct processors and/or memory elements can be used to implement different ones of modules 126, 128, 130 or portions thereof. At least portions of modules 126, 128, 130 may be implemented at least in part in the form of software that is stored in memory and executed by a processor. In some embodiments, one or more of modules 126, 128, 130 or portions thereof may be implemented on a separate server or client device (e.g., user device 102) that is distinct from the storage system 120.

The storage controller 124 and the storage system 120 may further include one or more additional modules and other components typically found in conventional implementations of storage controllers and storage systems, although such additional modules and other components are omitted from the figure for clarity and simplicity of illustration.

The storage system 120 in some embodiments is implemented as a distributed storage system, also referred to herein as a clustered storage system, comprising a plurality of storage nodes. Each of at least a subset of the storage nodes illustratively comprises a set of processing modules configured to communicate with corresponding sets of processing modules on other ones of the storage nodes. The sets of processing modules of the storage nodes of the storage system 120 in such an embodiment collectively comprise at least a portion of the storage controller 124 of the storage system 120. For example, in some embodiments the sets of processing modules of the storage nodes collectively comprise a distributed storage controller of the distributed storage system 120. A "distributed storage system" as that term is broadly used herein is intended to encompass any storage system that, like the storage system 120, is distributed across multiple storage nodes.

Each storage node of a distributed implementation of storage system 120 illustratively comprises a CPU or other type of processor, a memory, a network interface card (NIC) or other type of network interface, and a subset of the storage nodes 122, possibly arranged as part of a disk array enclosure (DAE) of the storage node. These and other references to "disks" herein are intended to refer generally to storage devices, including SSDs, and should therefore not be viewed as limited to spinning magnetic media.

The storage system 120 in the FIG. 1 embodiment is assumed to be implemented using at least one processing platform, with each such processing platform comprising one or more processing devices, and each such processing device comprising a processor coupled to a memory. Such processing devices can illustratively include particular arrangements of compute, storage and network resources. As indicated previously, the user devices 102 (for example, when implemented as host devices) may be implemented in whole or in part on the same processing platform as the storage system 120 or on a separate processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the user devices 102 and the storage system 120 to reside in different data centers. Numerous other distributed implementations of the host devices and the storage system 120 are possible.

Also associated with one or more of the user devices 102 can be one or more input/output devices (not shown), which illustratively comprise keyboards, displays or other types of input/output devices in any combination. Such input/output devices can be used, for example, to support one or more user interfaces to the user devices 102, as well as to support communication between the user devices 102 and other related systems and devices not explicitly shown.

The user devices 102 in the FIG. 1 embodiment are assumed to be implemented using at least one processing device. Each such processing device generally comprises at least one processor and an associated memory, and implements one or more functional modules for controlling certain features of the user devices 102. More particularly, the user devices 102 in this embodiment can comprise a processor coupled to a memory and a network interface. The network interface allows the user devices 102 to communicate over the network 104 with each other (as well as one or more other networked devices), and illustratively comprises one or more conventional transceivers.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including SSDs, and should therefore not be viewed as limited in any way to spinning magnetic media.

It is to be understood that the particular set of elements shown in FIG. 1 for securing data storage by slicing swapped data portions into data fragments and shuffling a physical storage location of the data fragments is presented by way of illustrative example only, and in other embodiments additional or alternative elements may be used. Thus, another embodiment includes additional or alternative systems, devices and other network entities, as well as different arrangements of modules and other components.

In some embodiments, the shuffle index module 128 is configured to shuffle or swap the physical locations of data fragments (e.g., keys, file digests and/or hash values) in response to an occurrence of various designated conditions. For example, the designated condition may be a file or data access operation, a designated number of file or data access operations, expiration of a predetermined time period, detection of a user request to initiate shuffling from an authorized user, detection of one or more events, etc.

The shuffle index module 128 implements a shuffle index to distribute data fragments across the data stores 123 of the storage nodes 122. In some embodiments, the data fragments are distributed among the storage nodes 122 utilizing a tree structure, where the leaves of the tree structure store the data fragments. The tree structure in some embodiments is a B+-tree structure, such as an unchained B+ tree. The internal nodes and leaves of the tree structure are distributed among the storage nodes 122 of the storage system 120. In some embodiments, the internal nodes and leaves are uniformly distributed among the storage nodes 122 of the storage system 120.

As mentioned above, the tree structure may be an unchained B+ tree, or a B+ tree with no links between leaves. Data fragments are stored in the leaves, with internal nodes and leaves being distributed amongst the storage nodes 122. The particular number of the storage nodes 122, or portions of the data stores 123, may be selected to provide a balance between performance and security. Various embodiments are described herein using three data stores 123 (e.g., three instances of data store 123), which provides a good balance between performance and security. It is to be appreciated, however, that embodiments are not limited to shuffling amongst three file data stores and that shuffling may be implemented for various other numbers of data stores.

Each of the nodes of the B+ tree has a logical identifier. The logical identifiers are translated at the physical level into a physical location where the data (e.g., a data fragment) is stored in one of the storage nodes 122. The tree structure may be evenly distributed across the data stores 123. For a three data store arrangement, for example, each data store may store one third of the nodes in the shuffle index, and approximately one third of the children of each node.

The shuffle index implemented by shuffle index module 128 acts as an intermediary between the users (e.g., user devices 102) and the data stores 123. In some embodiments, for each data access operation, the shuffle index module 128 carries out a subsequent shuffle operation which shuffles data into different physical locations on the data stores 123 by reordering the leaf nodes of the shuffle index (e.g., leaf nodes of a B+-tree structure). This shuffling operation may involve many downloads and uploads. As a result, neither the user nor the data stores 123 are able to establish access patterns to learn the physical storage location of a given data fragment.

In terms of file size, key values, hash values and file digests are typically small and uniform. Thus, when the shuffle index is applied to them, issues of shuffle operation performance overhead and pattern analysis by file size are avoided. A hash function, for example, takes data of arbitrary size as input and produces a fixed length output (e.g., a hash value or message digest). The output of an effective hash function will be collision resistant, which enforces uniqueness.

This uniqueness makes hash values suitable for creating a fingerprint of a large data set which can later be used for purposes such as the verification of whether or not the data set has changed, or for testing that two data sets are equal. In the case of distributed hash tables these qualities are also useful for assigning unique and uniformly-sized identifiers for locating files.

Application of the shuffle index in storage system 120 using shuffle index module 128 advantageously obfuscates the physical storage locations of data fragments, thus providing protection to these data fragments and increasing the complexity of executing certain types of attacks. The shuffle index, when deployed in a configuration with three data stores, is also resistant to the threat posed by these data stores sharing information with each other. In a DHT architecture, hash values are stored in tables across multiple single-node data stores, thus making the DHT architecture particularly suitable for shuffle index integration.

Figure 2:
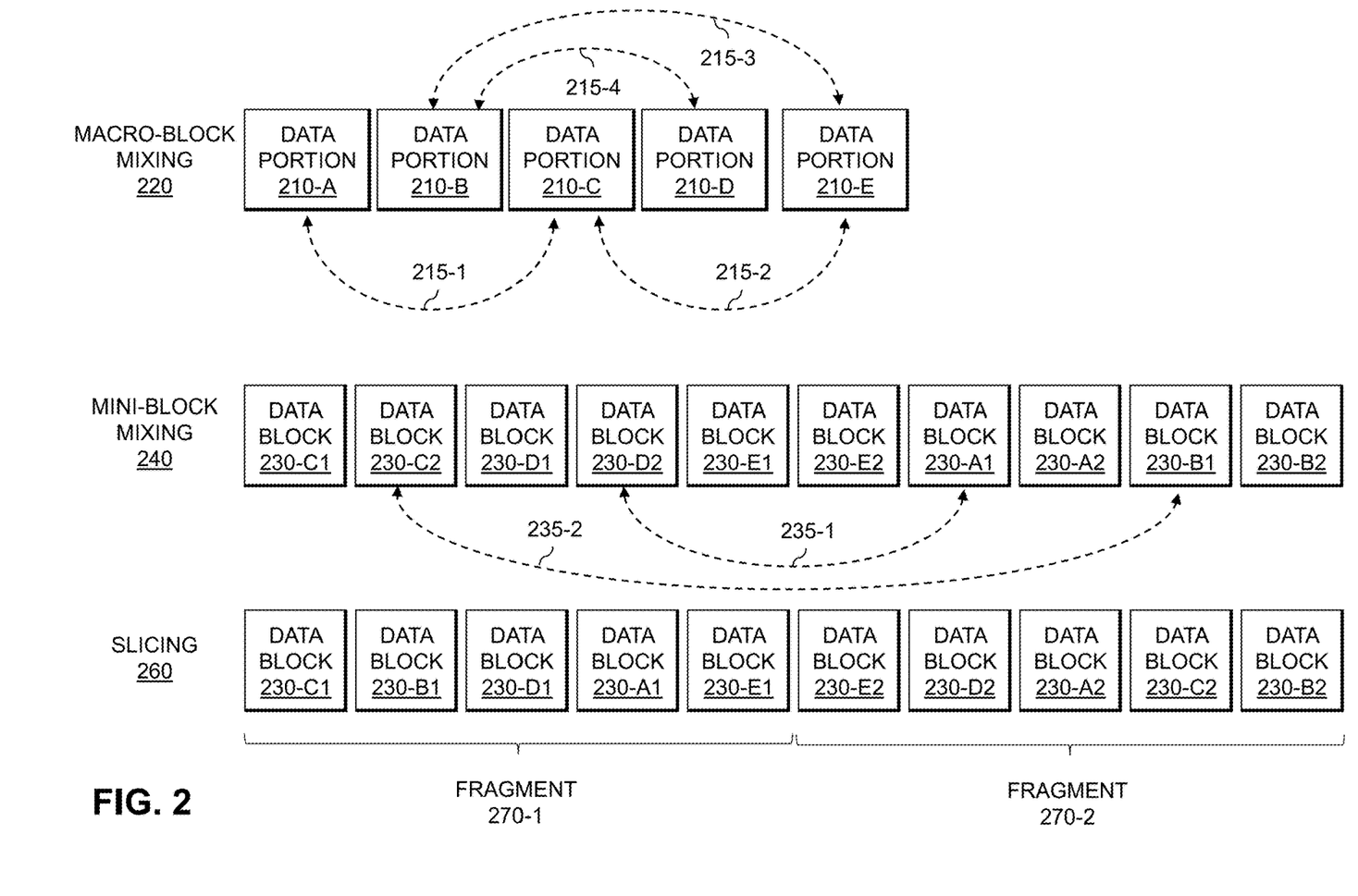
FIG. 2 illustrates a number of exemplary operations performed by the mix and slice encryption module of FIG. 1 according to one or more embodiments.

FIG. 2 illustrates a number of exemplary operations 220, 240, 260 performed by the mix and slice encryption module 126 of FIG. 1 according to one or more embodiments. In the example of FIG. 2, a block of data (e.g., a data item) has been subdivided into macro-blocks comprising data portions 210-A through 210-E and then mixed in a macro-block mixing step 220, in accordance with the sequence of arrows 215-1 through 215-4.

Each data portion 210 is then further subdivided in a mini-block mixing step 240 into two data blocks, such as data blocks 230-C1 and 230-C2 for data portion 210-C, data blocks 230-D1 and 230-D2 for data portion 210-D, data blocks 230-E1 and 230-E2 for data portion 210-E, data blocks 230-A1 and 230-A2 for data portion 210-A and data blocks 230-B1 and 230-B2 for data portion 210-B. The data blocks 230 are then mixed again, in accordance with the sequence of arrows 235-1 and 235-2.

The mixed data blocks 230 are then sliced into equally sized fragments 270-1 and 270-2 (e.g., encrypted fragments). In some embodiments, each fragment 270 may be uniformly-sized and comprises data from all of the data portions 210-A through 210-E that comprised the original input data.

Figure 3:
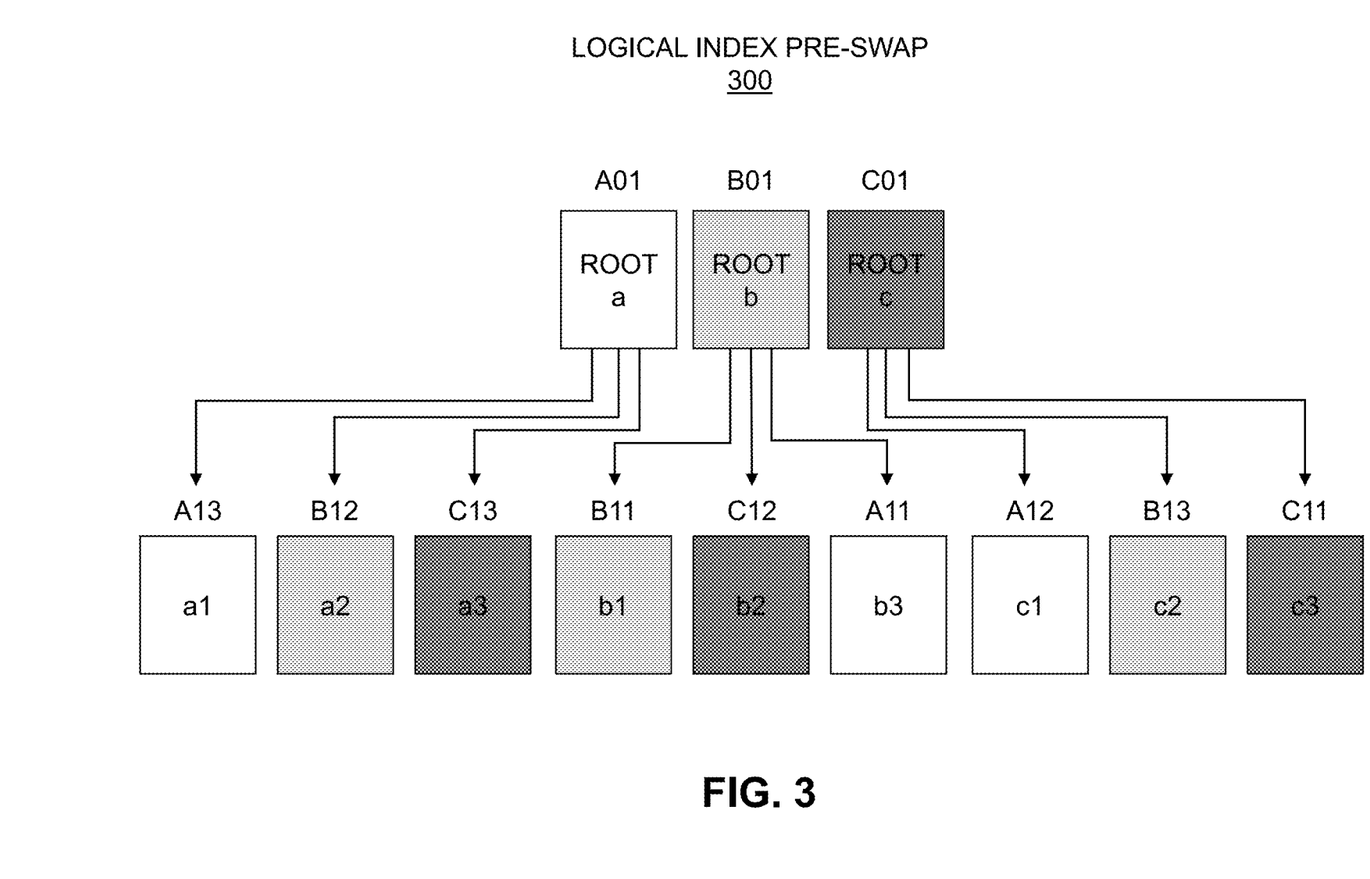
FIGS. 3 through 5 illustrate a number of exemplary operations performed by the shuffle index module of FIG. 1, according to at least one embodiment.
Figure 4:
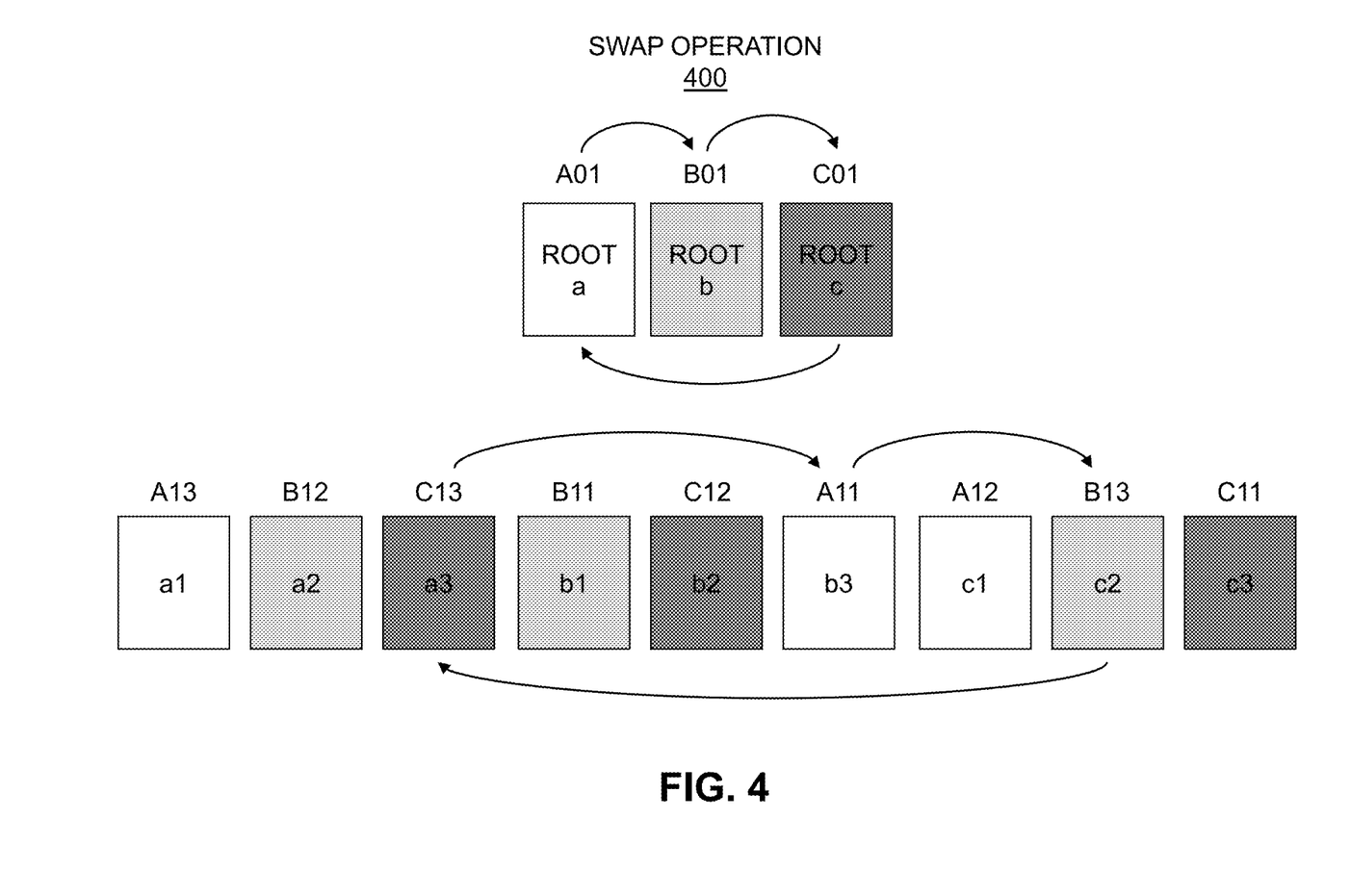
Figure 5:
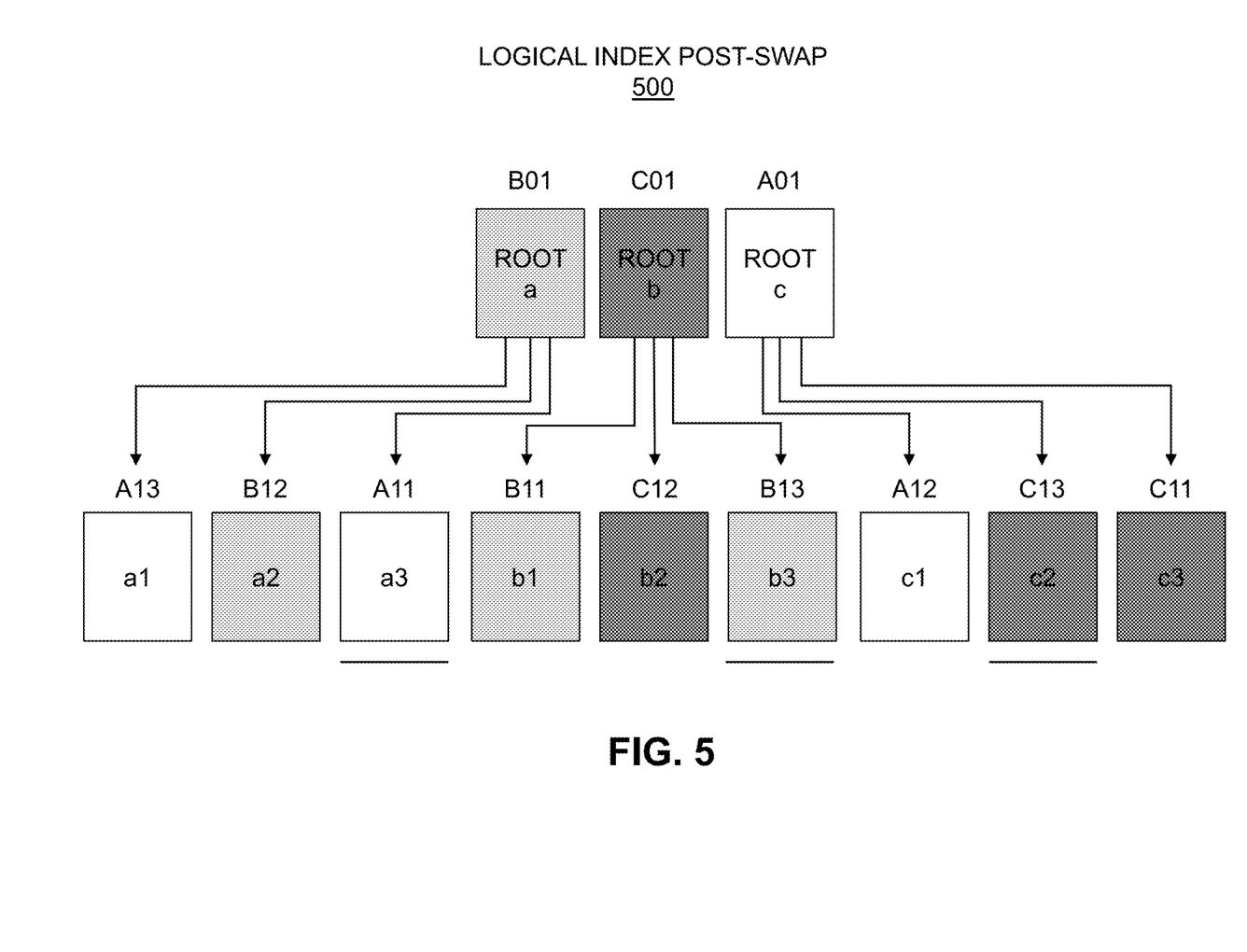

FIGS. 3 through 5 illustrates a number of exemplary operations performed by the shuffle index module of FIG. 1, according to at least one embodiment. Generally, FIGS. 3 through 5 illustrate the process of one swap operation carried out by the shuffle index module 128 to reorder the physical locations of data fragments. In at least some embodiments, each leaf node in FIG. 2 comprises one data fragment. FIGS. 3 through 5 provide a hierarchical perspective of the logical file index and how it remains static regardless of the swap operations.

FIG. 3 shows a logical index 300 of the shuffle index structure, before a swap operation. The logical index 300 illustrates what the user or shuffle index layer sees, which in this case includes root a, root b and root c on the physical storage nodes A01, B01 and C01. Root a, root b and root c denote supersets housing respective sets of leaf nodes. The leaf nodes store respective data fragments, such as key values, file digests or file hash values. The structure is hierarchical, and the root nodes a, b and c contain respective sets of leaf nodes. This is illustrated by the logical index 300 of FIG. 3. The file hash values a1, a2 and a3 contained in "root a" are stored in leaf nodes A13, B12 and C13, respectively, on the different physical nodes denoted A, B and C. The file hash values b1, b2 and b3 contained in "root b" are stored in leaf nodes B11, C12 and A11, respectively, on the different physical nodes B, C and A. The file hash values c1, c2 and c3 contained in "root c" are stored in leaf nodes A12, B13 and C11, respectively, on the different physical nodes A, B and C. The shuffle index, as illustrated in FIG. 3, stores different data fragments n the different physical nodes A, B and C.

FIG. 4 shows the swap operation 400. The swap operation 400 of FIG. 4 shows the shuffling of data fragments named: A11, B13 and C13 across physical locations named a3, b3, c2.

In at least some embodiments, the swap operation 400, as shown in FIG. 4, is done at each level of the tree hierarchy. At the first level, root a is moved from node A01 to node B01, root b is moved from node B01 to node C01, and root c is moved from node C01 to node A01. At the second level, data fragment a3 is moved from node C13 to node A11, data fragment b3 is moved from node A11 to node B13, and data fragment c2 is moved from node B13 to node C13.

FIG. 5 shows the logical index 500 after the swap operation 400, where the root values a, b and c are now on nodes B01, C01 and A01, respectively, and the file hash values a3, b3 and c2 are now on nodes A11, B13 and C13, respectively, as shown by the underlined nodes A11, B13 and C13.

FIGS. 3-5 illustrate one swap operation. It should be appreciated, however, that a shuffle operation may include a combination of many swap operations. The shuffle operation may take place upon a detection of various designated conditions. In some embodiments, the shuffle operation takes place after each data or file access operation. In other embodiments, the shuffle operation may take place after every nth data or file access operation, where n is greater than 1. In still other embodiments, the shuffle operation may take place after expiration of a designated time period (e.g., a shuffle operation may be performed periodically such as every minute, every hour, every day, etc.), in response to an explicit shuffle request (e.g., from an authorized user), or in response to detection of some designated condition (e.g., a potential tampering event, detection of a security threat, etc.).

Figure 6:
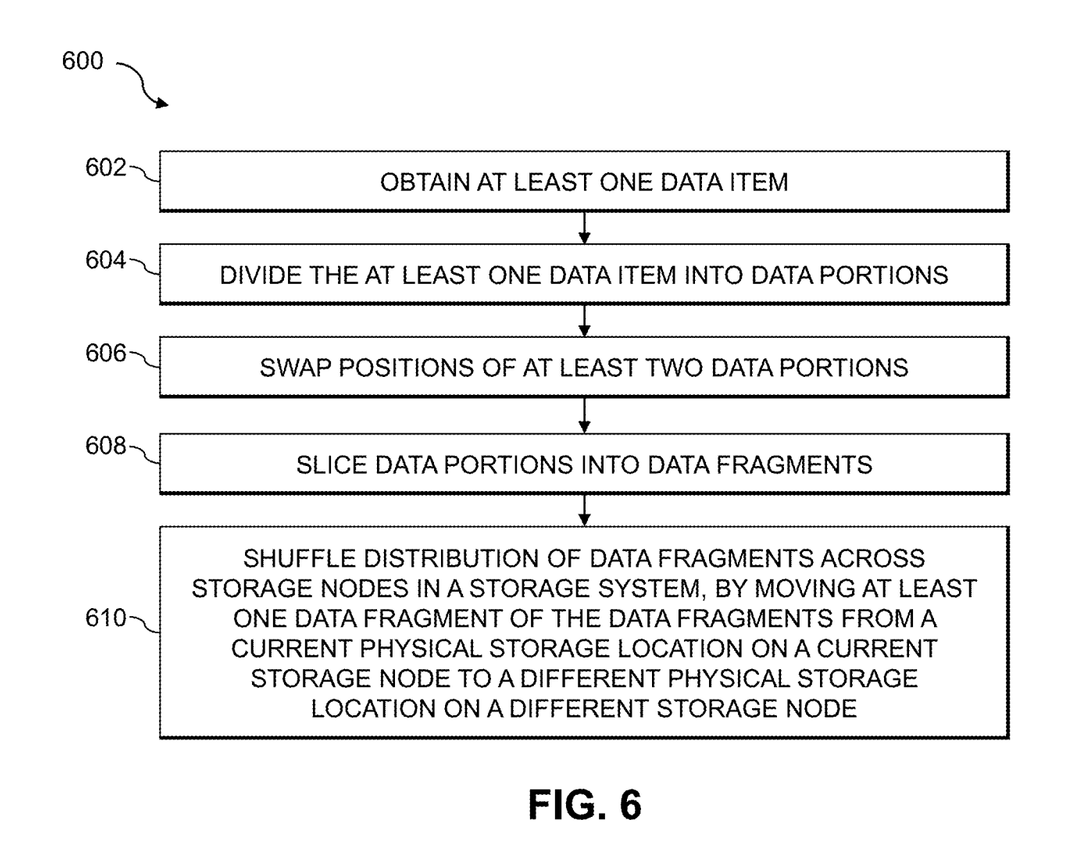
FIG. 6 is a flow diagram illustrating an exemplary implementation of a process for securing data in a storage system, according to various embodiments.

FIG. 6 is a flow diagram illustrating an exemplary implementation of a process 600 for securing data in a storage system, according to various embodiments. In the example of FIG. 6, at least one data item is initially obtained in step 602. The at least one data item is divided into a plurality of data portions in step 604 and then positions of at least two of the data portions of the at least one data item are swapped in step 606. In step 608 the plurality of data portions, following the swapping of step 606, are sliced into a plurality of data fragments. In some embodiments, steps 604 through 608 collectively comprise a mix and slice encryption, as discussed above in conjunction with FIG. 2.

A distribution of the plurality of data fragments is shuffled across a plurality of storage nodes in a storage system in step 610, wherein the shuffling the distribution of the data fragments across the plurality of storage nodes comprises moving at least one data fragment of the plurality of data fragments from a current physical storage location on a current storage node of the plurality of storage nodes to a different physical storage location on a different storage node of the plurality of storage nodes.

In some embodiments, the at least one data item may comprise a cryptographic key, a hash value of a file stored in the storage system, a file digest of a file stored in the storage system, and/or a block of data. Each data fragment may be uniformly-sized and comprises data from a plurality of the data portions. A predefined number (e.g., all) of the plurality of data fragments may be needed to reconstruct the data item.

The particular processing operations and other network functionality described in conjunction with the flow diagram of FIG. 6 are presented by way of illustrative example only, and should not be construed as limiting the scope of the disclosure in any way. Alternative embodiments can use other types of processing operations for securing data storage using mix and slice encryption to generate data fragments and a shuffling of the physical storage location of the data fragments. For example, the ordering of the process steps may be varied in other embodiments, or certain steps may be performed concurrently with one another rather than serially. In some embodiments, the shuffle operation of step 610 may be performed before the dividing, swapping and slice operations of steps 604-608. In one aspect, the process can skip one or more of the actions. In other aspects, one or more of the actions are performed simultaneously. In some aspects, additional actions can be performed.

One or more embodiments of the disclosure provide improved methods, apparatus and computer program products for securing data storage using mix and slice encryption to generate data fragments and a shuffling of the physical storage location of the data fragments. The foregoing applications and associated embodiments should be considered as illustrative only, and numerous other embodiments can be configured using the techniques disclosed herein, in a wide variety of different applications.

It should also be understood that the disclosed techniques for securing data storage using mix and slice encryption to generate data fragments and a shuffling of the physical storage location of the data fragments, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for secure data storage may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS, IaaS and/or a FaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based sensitive data identification engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based sensitive data identification platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. These platforms may also be used to implement at least portions of other information processing systems in other embodiments.

Figure 7:
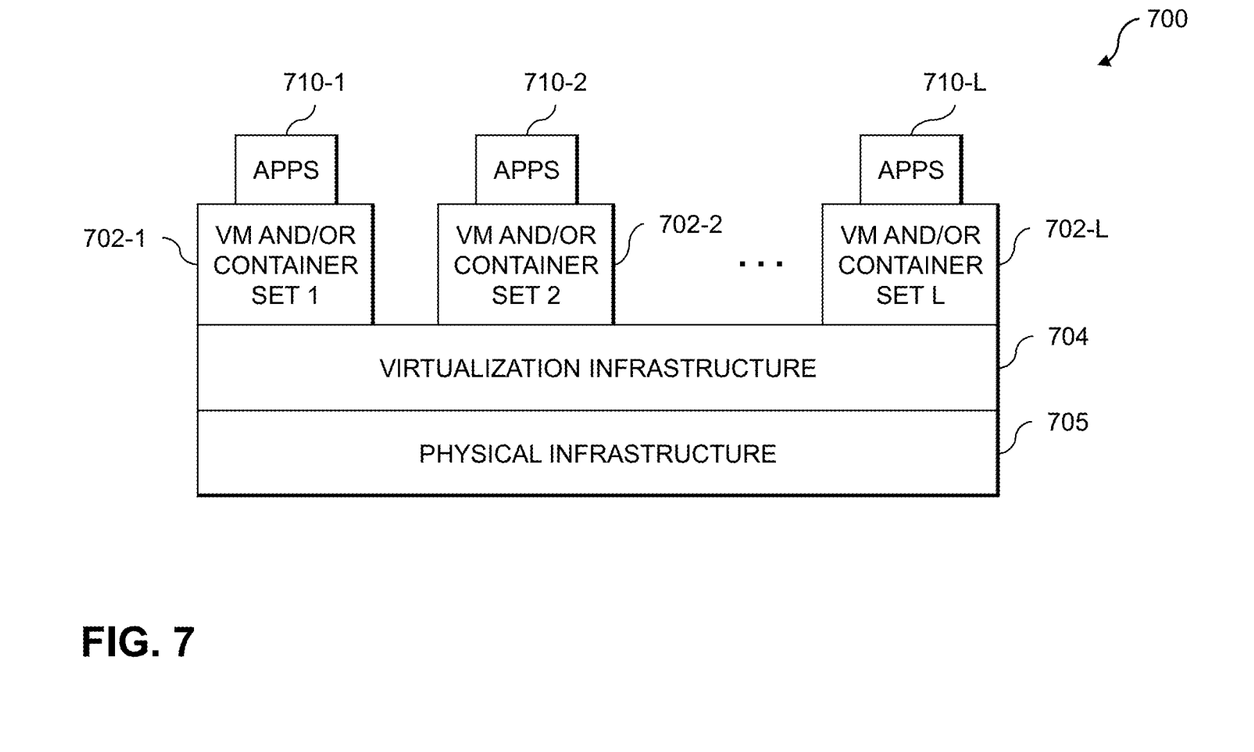
FIG. 7 illustrates an exemplary processing platform that may be used to implement at least a portion of one or more embodiments of the disclosure comprising a cloud infrastructure.

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises multiple virtual machines (VMs) and/or container sets 702-1, 702-2, ... 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, ... 710-L running on respective ones of the VMs/container sets 702-1, 702-2, ... 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. Such implementations can provide secure data storage functionality of the type described above for one or more processes running on a given one of the VMs. For example, each of the VMs can implement secure data storage control logic and associated functionality for performing mix and slice encryption to generate data fragments and for shuffling the physical storage location of the data fragments for one or more processes running on that particular VM.

An example of a hypervisor platform that may be used to implement a hypervisor within the virtualization infrastructure 704 is the VMware® vSphere® which may have an associated virtual infrastructure management system such as the VMware® vCenter™. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system. Such implementations can provide secure data storage functionality of the type described above for one or more processes running on different ones of the containers. For example, a container host device supporting multiple containers of one or more container sets can implement one or more instances of secure data storage control logic and associated functionality for performing mix and slice encryption to generate data fragments and for shuffling the physical storage location of the data fragments.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises at least a portion of the given system and includes a plurality of processing devices, denoted 802-1, 802-2, 802-3, ... 802-K, which communicate with one another over a network 804. The network 804 may comprise any type of network, such as a WAN, a LAN, a satellite network, a telephone or cable network, a cellular network, a wireless network such as WiFi or WiMAX, or various portions or combinations of these and other types of networks.

The processing device 802-1 in the processing platform 800 comprises a processor 810 coupled to a memory 812. The processor 810 may comprise a microprocessor, a microcontroller, an ASIC, an FPGA or other type of processing circuitry, as well as portions or combinations of such circuitry elements, and the memory 812, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and the given system may include additional or alternative processing platforms, as well as numerous distinct processing platforms in any combination, with each such platform comprising one or more computers, storage devices or other processing devices.

Figure 8:
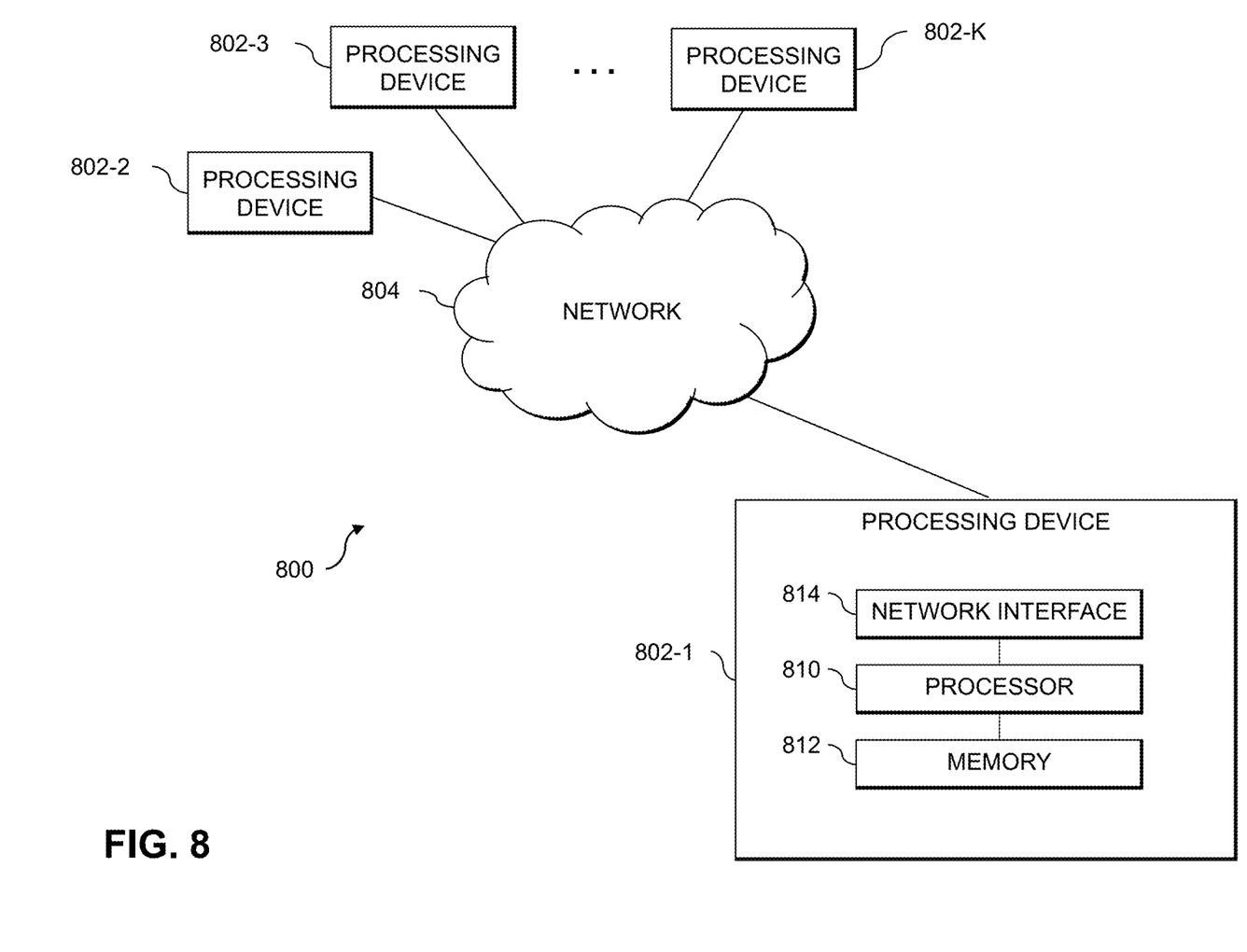
FIG. 8 illustrates another exemplary processing platform that may be used to implement at least a portion of one or more embodiments of the disclosure.

Multiple elements of an information processing system may be collectively implemented on a common processing platform of the type shown in FIG. 7 or 8, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell Technologies.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
    obtaining at least one data item;
    dividing the at least one data item into a plurality of data portions;
    swapping respective positions of at least two of the plurality of data portions of the at least one data item;
    slicing the plurality of data portions, following the swapping, into a plurality of data fragments; and
    shuffling, following the slicing, a distribution of at least some of the data fragments across a plurality of storage nodes in a storage system, wherein the shuffling the distribution of at least some of the data fragments across the plurality of storage nodes comprises moving at least one data fragment of the plurality of data fragments from a current physical storage location on a current storage node of the plurality of storage nodes to a different physical storage location on a different storage node of the plurality of storage nodes;
    wherein the method is performed by at least one processing device, wherein the at least one processing device comprises a processor coupled to a memory.

2. The method of claim 1, wherein the at least one data item comprises one or more of a cryptographic key, a hash value of a file stored in the storage system, a file digest of a file stored in the storage system, and a block of data.

3. The method of claim 2, further comprising maintaining a given file associated with one or more of a given hash value and a given file digest in a current physical storage location of the given file in the storage system.

4. The method of claim 1, wherein the plurality of storage nodes comprises at least three storage nodes.

5. The method of claim 1, wherein each of the data fragments are uniformly-sized and comprise data from a plurality of the data portions.

6. The method of claim 1, wherein the shuffling the distribution of at least some of the data fragments across the plurality of storage nodes is performed in response to an occurrence of one or more of a time-based trigger and an event-based trigger.

7. The method of claim 1, wherein the dividing the at least one data item into the plurality of data portions and the swapping the respective positions of the at least two data portions are each performed at least two times for the at least one data item.

8. The method of claim 1, wherein the dividing the at least one data item into the plurality of data portions, the swapping the respective positions of the at least two data portions and the slicing the plurality of data portions into the plurality of data fragments comprise an all-or-nothing transform.

9. The method of claim 1, wherein the shuffling the distribution of at least some of the data fragments across the plurality of storage nodes further comprises utilizing a set of swap operations that moves at least a subset of the data fragments between two or more of a plurality of nodes in at least one of two or more levels of a tree structure comprising the plurality of nodes.

10. The method of claim 9, wherein each data fragment is stored in a corresponding leaf of the tree structure.

11. The method of claim 1, wherein a predefined number of the plurality of data fragments is needed to reconstruct the data item.

12. An apparatus comprising:
    at least one processing device comprising a processor coupled to a memory;
    the at least one processing device being configured to implement the following steps:
    obtaining at least one data item;
    dividing the at least one data item into a plurality of data portions;
    swapping respective positions of at least two of the plurality of data portions of the at least one data item;
    slicing the plurality of data portions, following the swapping, into a plurality of data fragments; and
    shuffling, following the slicing, a distribution of at least some of the data fragments across a plurality of storage nodes in a storage system, wherein the shuffling the distribution of at least some of the data fragments across the plurality of storage nodes comprises moving at least one data fragment of the plurality of data fragments from a current physical storage location on a current storage node of the plurality of storage nodes to a different physical storage location on a different storage node of the plurality of storage nodes.

13. The apparatus of claim 12, wherein the at least one data item comprises one or more of a cryptographic key, a hash value of a file stored in the storage system, a file digest of a file stored in the storage system, and a block of data.

14. The apparatus of claim 12, wherein each of the data fragments are uniformly-sized and comprise data from a plurality of the data portions.

15. The apparatus of claim 12, wherein the shuffling the distribution of at least some of the data fragments across the plurality of storage nodes is performed in response to an occurrence of one or more of a time-based trigger and an event-based trigger.

16. The apparatus of claim 12, wherein a predefined number of the plurality of data fragments is needed to reconstruct the data item.

17. A non-transitory processor-readable storage medium having stored therein program code of one or more software programs, wherein the program code when executed by at least one processing device causes the at least one processing device to perform the following steps:
obtaining at least one data item;
dividing the at least one data item into a plurality of data portions;
swapping respective positions of at least two of the plurality of data portions of the at least one data item;
slicing the plurality of data portions, following the swapping, into a plurality of data fragments; and
shuffling, following the slicing, a distribution of at least some of the data fragments across a plurality of storage nodes in a storage system, wherein the shuffling the distribution of at least some of the data fragments across the plurality of storage nodes comprises moving at least one data fragment of the plurality of data fragments from a current physical storage location on a current storage node of the plurality of storage nodes to a different physical storage location on a different storage node of the plurality of storage nodes.

18. The non-transitory processor-readable storage medium of claim 17, wherein the at least one data item comprises one or more of a cryptographic key, a hash value of a file stored in the storage system, a file digest of a file stored in the storage system, and a block of data.

19. The non-transitory processor-readable storage medium of claim 17, wherein each of the data fragments are uniformly-sized and comprise data from a plurality of the data portions.

20. The non-transitory processor-readable storage medium of claim 17, wherein a predefined number of the plurality of data fragments is needed to reconstruct the data item.

* * * * *